Sept. 5, 1933.    N. MANNING    1,925,266
EYELASH CURLER
Filed April 15, 1932
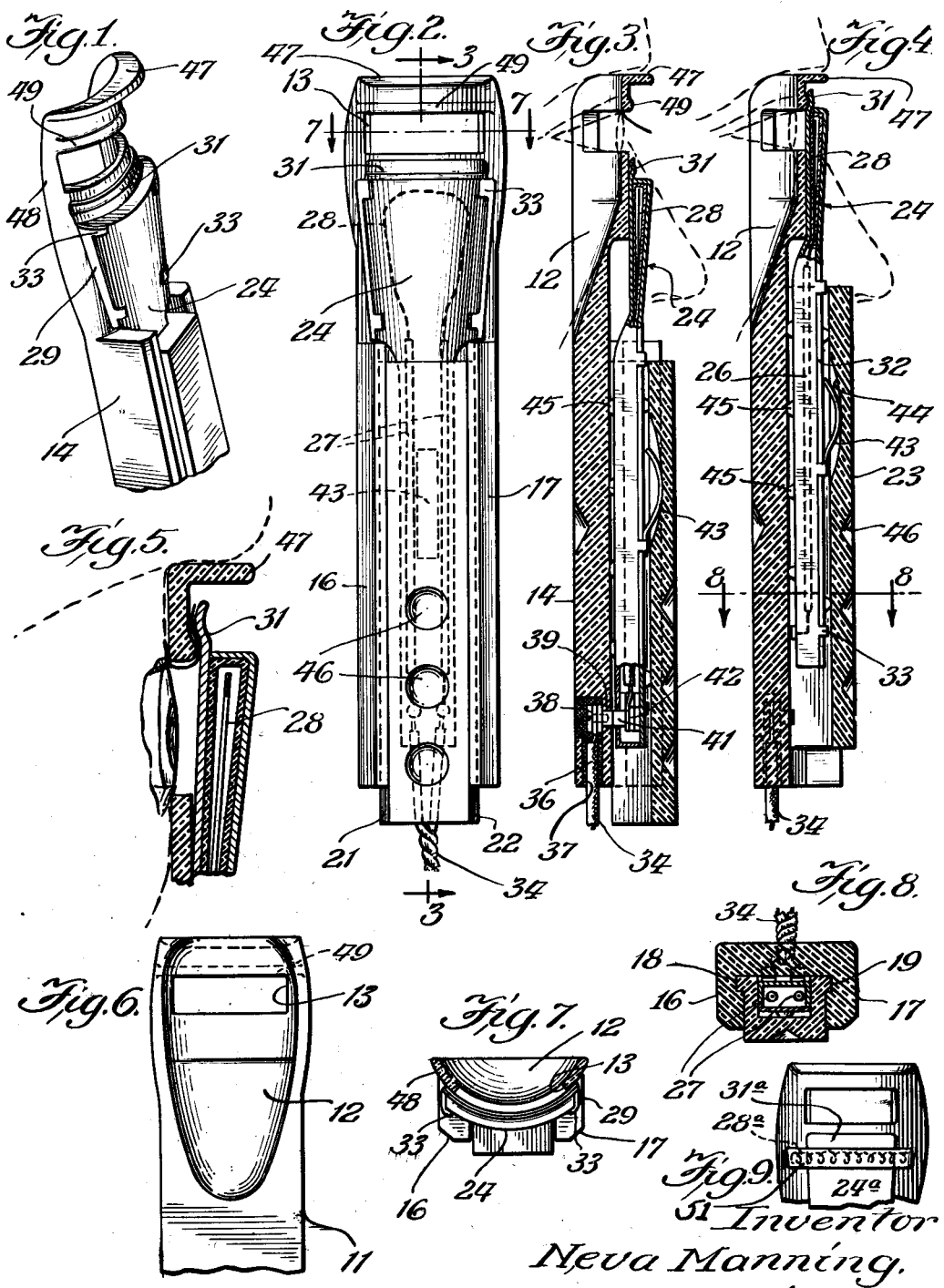
Inventor
Neva Manning.
By Mueller and McLaughlin
Attys Patented Sept. 5, 1933

1,925,266

UNITED STATES PATENT OFFICE 1,925,266

EYELASH CURLER

Neva Manning, Chicago, Ill.

Application April 15, 1932. Serial No. 605,443

8 Claims. (Cl. 219—24)

My invention relates to eyelash curlers, and more in particular to electrically heated devices of this type.

Heretofore, eyelash curlers have been operated by continued pressure of two non-heated members acting upon the lashes for a considerable length of time until they are trained to the shape desired. This is not only a long and tedious process, but a painful one as well and tends to break the hair.

It is an object of my invention to provide an improved eye lash curler.

It is also an object to provide an electrically heated eyelash curler operating in a manner similar to an electric hair curler which will quickly shape the lashes to the desired curve.

A further object is to provide an electric eyelash curler which will curl the lashes without pain or injury, and A further object is to provide an electric eyelash curler simple in structure, and easy of operation, which may be quickly disassembled for cleaning so as to be absolutely sanitary.

Other objects and advantages will appear as the description proceeds.

Referring now to the drawing:

Fig. 1 is a fragmentary view in perspective of the top of my eyelash curler;

Fig. 2 is a front elevation of the curler;

Fig. 3 is a sectional view along line 3—3 of Fig. 2, with the lower portion of the handle broken away to show the switch employed, said switch being in contact position;

Fig. 4 is a sectional view of the curler with the switch in off contact position, and the curling iron in operative position;

Fig. 5 is an enlarged fragmentary view of the top of the curler in the position shown in Fig. 4;

Fig. 6 is a fragmentary view in elevation of the body of the curler;

Fig. 7 is a sectional view along line 7—7 of Fig. 2;

Fig. 8 is a sectional view along line 8—8 of Fig. 4; and

Fig. 9 is a fragmentary view in elevation of a modification of the eye lash curler.

In the preferred form of my invention, I provide a body formed of a hard insulating material of poor heat conducting substance such as a phenolic condensation product comprising a top portion adapted to fit over the eye, and apertured to receive the eyelashes, and a handle channelled for carrying the electrically heated curling element. The handle is composed of a movable top, slidable in the channelled portion, and adapted for holding the curling element in the channel, and moving it in and out of operative position with respect to the curling of the eyelashes.

The eyelash curler has a non-heated body 11, preferably formed of a phenolic condensation produce or a similar insulating material having a low heat conductivity, said body comprising a cupped top portion 12 having a rectangular aperture 13 therein, and a handle 14. The handle 14 is channelled along its top surface with flanges 16 and 17 extending vertically on both sides of the channel, said flanges having grooves 18 and 19 along the inside thereof and adapted to receive corresponding flanges 21 and 22 on the sliding cover 23 of the handle 14. The sliding cover 23 is likewise channelled over its entire length and when in the position described above (Fig. 3), a cavity is formed for carrying the heated curling element 24. The element 24 comprises a metal box-like body having a narrow shaft 26 for housing the two insulated wires 27 for completing the circuit to the resistance element 28, said element laying in asbestos or mica in the spade-shaped top 29. A tongue 31 integral with the top portion 29 and projecting upwardly from the same bends slightly inward and like the under side of the top portion 29 is somewhat concave in shape to conform to the cupped-portion 12 of the body 11 of the device. The lead wires 27 and the resistance wire 28 are enclosed in the element 24 by means of a plate 32 fitting over the entire box and held thereon by lugs 33 extending from the sides and bent over the plate at regular intervals around the edge.

Current for heating the resistance element 28 is supplied from the regular light socket and fed to the curler through an ordinary lamp cord 34. Each of the wires 36 are inserted in holes 37 in the end of the handle 14 and secured to binding posts 38, as shown in Fig. 3. Sealing wax may be used to seal up the binding posts after the wire is secured thereto. Contacts 39 integral with the binding posts 38 protrude through the handle 14 into the floor of the channelled portion and contact with a corresponding pair of contacts 41 in the curling element 24 when it is in the position shown in Fig. 3. The contacts 41 are integral with binding posts 42, to which the wires 27 are secured with each entire element mounted in the shaft 26 and insulated on all sides therefrom.

A spring 43, secured to the top of the shaft 26 by lugs bent over and clamping one end of the spring, fits into a concave groove 44 on the inside of the sliding top 23. This spring presses against the bottom of the groove and holds the curling element 24 in fixed relationship to the sliding top 23. Small knobs 45 protruding from the lower side of the shaft 26 facilitate the sliding of the curling element over the floor of the channel in the handle 14, in moving the element in and out of operative position, and depressions 46 in the sliding top of the handle act as grips for the fingers when moving the top 23 and the curling element therewith.

When operating the device to curl the eyelashes, a plug on the cord 34 is inserted in an ordinary light socket and with the curling element 24 in the position shown in Fig. 3, a circuit is completed through contact points 39 and 41 and the resistance wire 28 to heat the latter. This in turn heats the top portion 29 of the curling element and particularly the tongue 31. Holding the device in the hand, the cupped portion 12 is placed against the cheek bone immediately below the eye with the aperture 13 opposite the eye so that the eyelashes will protrude through the same (Fig. 3). The flange 47, extending forwardly on the top edge of the non-heated element 11, rests against the bone immediately above the eyelid and the entire top portion of the device is so shaped as to rest comfortably around the eye, and positioned far enough away from the eye and eyelid to prevent contact with the heated element 24. The low heat conductivity of the material from which the non-heated element 11 is formed, and the thickness of those portions resting against the skin insures against injury thereto. Conductivity of heat from the cupped portion 12 to the flange 47 is also lessened by reason of the narrow connecting portions 48 on both sides of the aperture 13. With the device in this position, the sliding top 23 of the handle is moved upwardly carrying with it the heated curling element 24 (Fig. 4). This breaks contact between the points 39 and 41 so that the element 24 is no longer being heated, thus further insuring against injury. As the curling element is moved upward, the tongue 31 engages the eyelashes and carries them up with it as it rides over the ridge 49, thus bending the eyelashes upwardly and curving them slightly over the ridge (Fig. 5). They need be held in this position only so long as one would hold hair around an ordinary curling iron to curl the same.

In such an appliance as this which is adapted for use in a beauty parlor, as well as the home, it is very necessasry that it be easily cleaned and sanitary in use. The particular structure of my device enables the operator to disassemble it very quickly. The sliding top 23 will ride over the spring 43 when slight added pressure is applied downwardly, and the top will slide completely out of the channelled portion 14. The heated curling element 24 may then be removed from the handle and the three parts may each be separately cleaned.

Although I preferably employ a switch for cutting off the current from the heating element while the two curling members are in co-operative contact, I also contemplate connecting the leading-in conductors directly to the terminals of the heating element so as to maintain the current constantly applied to the device.

Fig. 9 illustrates a modification in the heating and curling element in which a resistance wire 28a is enclosed in a bridge 51 which is mounted on the non-heated frame and spans the tongue 31a of the curling element 24a. With this modification, the box-like construction is eliminated and the bridge 51a contacts directly with the metal curling element 24a on the tongue 31a whereby the latter is heated by the heat from the resistance element 28a. This heating is accomplished while the curling element is in a non-operative position corresponding to that shown in Fig. 2, and as the curling element 24a is moved upwardly, sliding under the bridge 51 to the operative position corresponding to that illustrated in Fig. 4, the tongue is out of contact with the bridge and no longer being heated. Thus the danger of injury due to continued heating after the eyelash is curled upwardly by the element 24a is eliminated. The resistance element 28a may be connected to the lead-in wires from the current supply in any convenient manner.

It will be further understood that the nature and embodiment of the invention herein described and illustrated is merely a convenient and useful form of the invention and that many changes may be made therein without departing from the spirit and scope of the invention.

What I claim as new and desire to protect by Letters Patent of the United States is:

1. An eyelash curler comprising a member adapted to rest against the upper eyelid and receive the lashes beneath a lower edge thereof, a second coacting member for curling the lashes over the lower edge of the first member, means for moving the element into and out of co-operative relation, an electric heating element carried by one of said members, and a switch for automatically cutting off the heating current responsive to movement of the elements into co-operative relation.

2. An eyelash curler comprising a frame of substantially non-heat conducting material transversely curved to rest against the upper lid and having a portion extending downwardly with an opening therethrough to receive the lashes whereby said frame acts as a heat protecting shield for the eye, a curling member slidingly carried by the frame adapted to be moved upwardly and across the outside of said downwardly extending frame portion and shaped to curl the lashes over said frame portion, and an electric heating element carried by the slidable curling member.

3. An eyelash curler comprising a member adapted to rest against the upper lid and receive the lashes beneath a lower edge thereof, a second coacting member for curling the lashes over the first member, means for moving the elements into and out of co-operative relation, an electric heating element mounted on said first member, and an automatic switch for effecting the heating of said second coacting member only when said members are out of co-operative relation.

4. An eyelash curler comprising a frame transversely curved to rest against the upper lid, having an opening therethrough to receive the lashes, a curling member slidingly carried by the frame adapted to be moved upwardly and shaped to curl the lashes over the frame, and an electric heating element mounted on said frame, bridging said curling member, and adapted to heat the top of said curling member.

5. An eyelash curler comprising a frame transversely curved to rest against the upper lid as a support and having an opening therethrough to receive the lashes beneath a transverse edge thereof, a curling member slidingly carried by the frame adapted to be moved upwardly across and contacting only with the front face of the transverse edge and having a portion thereof extending substantially above said edge when in curling position to curl the lashes over the transverse edge of the frame.

6. An eyelash curler comprising a frame having an upper and a lower portion, said upper portion transversely curved to rest against the upper lid and having a flange along the upper end thereof adapted to rest up against the head immediately above said eyelid as a support, said upper portion having a transverse opening therethrough to receive the lashes, and a curling member slidingly carried by the frame adapted to be moved upwardly across the front face of the frame to curl the lashes over the transverse curved portion of the frame.

7. An eyelash curler comprising a substantially non-heat conducting frame having an upper and a lower portion, said upper portion transversely curved to rest against the upper eye lid and having a flange along the upper edge thereof adapted to rest up against the head immediately above the eyelid, said upper portion having an opening therethrough to receive the lashes, a co-operating curling member, an electric heating element for heating said latter member, and means for slidably carrying said member on said frame for moving it upwardly whereby a heated portion of said member extends above said opening on the outside thereof to curl the lashes over the frame.

8. An eyelash curler comprising a frame having an upper and a lower portion, said upper portion adapted to rest against the upper lid and having an opening therethrough to receive the lashes, said lower portion comprising a handle having a channel extending lengthwise of same, said channel having a grooved flange on each side thereof, a closure member slidably carried by said grooves adapted to be moved upwardly, a curling member disposed in said channel and removably secured to said closure member whereby said curling member is carried upwardly by said closure member slidably of the frame and entirely on the outside thereof to curl the lashes over the frame, and an electric heating element carried by said curling member.

NEVA MANNING.